United States Patent [19]
Krishna et al.

[11] Patent Number: 5,822,538
[45] Date of Patent: Oct. 13, 1998

[54] METHOD AND APPARATUS FOR PRIORITIZING TRAFFIC IN HALF-DUPLEX NETWORKS BY SELECTING DELAY INTERVALS FROM FIXED RANGES

[75] Inventors: Gopal Krishna, San Jose; Mohan Kalkunte, Sunnyvale; Robert Alan Williams, Cupertino, all of Calif.

[73] Assignee: Advanced Micro Devices, Inc., Sunnyvale, Calif.

[21] Appl. No.: 752,884

[22] Filed: Nov. 20, 1996

[51] Int. Cl.$^6$ .................................................. G06F 13/00
[52] U.S. Cl. ...................... 395/200.65; 370/447
[58] Field of Search ........................ 395/200.3, 200.48, 395/200.47, 200.57, 200.6, 200.61, 200.62, 200.65, 200.66, 200.67; 370/445, 447, 448

[56] References Cited

U.S. PATENT DOCUMENTS

| | | | |
|---|---|---|---|
| 5,319,641 | 6/1994 | Fridrich et al. | 370/447 |
| 5,353,287 | 10/1994 | Kuddes et al. | 370/448 |
| 5,383,185 | 1/1995 | Armbruster et al. | 370/447 |
| 5,404,353 | 4/1995 | Ben-Michael et al. | 370/235 |
| 5,418,784 | 5/1995 | RamaKrishnan et al. | 370/445 |
| 5,422,887 | 6/1995 | Diepstraten et al. | 370/448 |
| 5,436,903 | 7/1995 | Yang et al. | 370/448 |
| 5,546,543 | 8/1996 | Yang et al. | 395/200.65 |

OTHER PUBLICATIONS

AMD, AM79C970 PCnet$^{198}$–PCI Single–Chip Ethernet Controler for PCI Local Bus, Jun. 1994, pp. 1–868–1–1033.

*Primary Examiner*—Parshotam S. Lall
*Assistant Examiner*—Viet Vu

[57] ABSTRACT

Collision delay intervals are modified in Ethernet network devices by transmitting priority data requiring a guaranteed latency by determining an integer multiple number of slot times, randomly selected from a predetermined range of integers, where the range of integers is independent from the number of access attempts. A network device having priority data for transmission randomly selects a collision delay interval to be either zero or one slot time for a predetermined number of access attempts. If the number of collisions encountered by the network station exceeds the predetermined number, the integer is selected from a range of integers calculated from a shifted exponential number of the access attempts, resulting in a smaller range than used for normal priority traffic. Use of the collision mediation for high priority traffic on a half-duplex Ethernet network provides a bounded access latency for real-time and multi-media applications by granting the network device a higher probability of successfully accessing the network media.

27 Claims, 5 Drawing Sheets

METHOD AND APPARATUS FOR PRIORITIZING TRAFFIC IN HALF-DUPLEX NETWORKS BY SELECTING DELAY INTERVALS FROM FIXED RANGES

FIELD OF THE INVENTION

The present invention relates to network interfacing and more particularly, to methods and systems efficiently accessing Ethernet media.

DESCRIPTION OF THE RELATED ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Hence, traffic is not distinguished or prioritized over the medium. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j=3, then the range of randomly selected time slots is (0,7); if the randomly-selected number of time slots is four, then the collision backoff interval will be equal to four slot time intervals. According to Ethernet protocol, the maximum range of randomly selected time slots is $2^{10}-1$.

Although collision mediation enables stations in a half-duplex network to contend for the media, collision mediation reduces the network throughput and creates unbounded packet access latencies. Consequently, applications requiring bounded access latencies such as interactive multimedia cannot be supported on such half-duplex networks.

Although a proposal has been made for enabling a station to have high priority over all other traffic on the medium (referred to as Priority Access Control Enabled), the proposal requires use of a switched hub. Hence, there has not been any disclosure of an arrangement for prioritizing traffic in a half-duplex Ethernet network.

DISCLOSURE OF THE INVENTION

There is a need for a method of mediating collisions in a network that provides a bounded access latency for high priority traffic.

There is also a need for a method of accessing media of a network that maintains quality of service for a network station.

These and other needs are attained by the present invention, where collision mediation is modified for high priority traffic requiring a guaranteed latency.

According to one aspect of the present invention, a method in a network station of mediating collisions on a network media includes the steps of sensing a collision on the media, determining a collision backoff interval based on a number of access attempts by the network station and a determined priority of data to be transmitted by the network station, and attempting access of the media in response to the detected collision and after the determined collision backoff interval. Determining the collision backoff interval based on the priority of the data and the number of access attempts provides a network station with a greater probability of winning a collision mediation with other stations contending for access of the media. Hence, a station can transmit high priority data on the network media with a guaranteed access latency.

Another aspect of the present invention provides a network interface for connection with a network media, comprising a queue for storing data identified as having high priority for transmission on the media, a collision sensor for sensing a collision on the media, a delay time calculator based on a number of access attempts by the network interface and the priority of the corresponding data, and a media access device for attempting access of the media in response to the sensed collision of the media and after said delay time. The network interface can selectively calculate the delay time, depending on the identified priority and the number of access attempts. Hence, if the network interface attempting to transmit priority data encounters a collision, the network interface may modify the delay time calculation to increase the probability of successful transmission.

Still another aspect of the present invention provides a method of accessing a network media, comprising transmitting a data packet carrying high priority data, sensing a collision on the media, determining a collision delay interval by randomly selecting an integer multiple of slot times from a predetermined range, based on a number of access attempts having a value less than or equal to a predetermined number, and attempting access of the media in response to the detected collision and after the collision delay interval. The random selection of an integer multiple of slot times from a predetermined range enables a network station to have a greater probability of success in accessing the network media compared to network stations mediating collisions using the truncated binary exponential backoff (TBEB) algorithm. Hence, a network station can support a desired quality of service on a half-duplex network for data requiring a guaranteed bandwidth, a bounded access latency, and a limited variance in delay (i.e., jitter).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
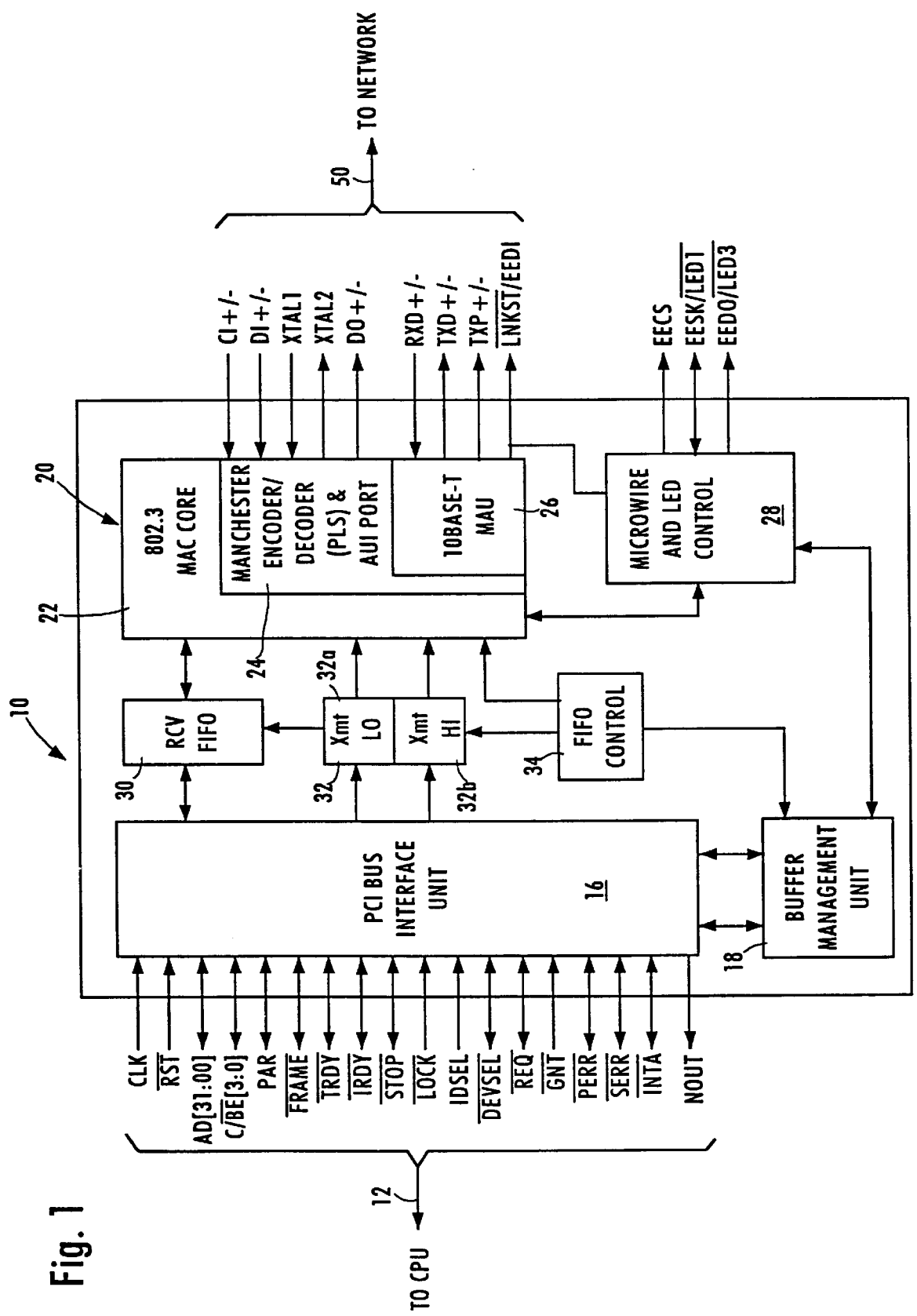
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1-868 to 1-1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU vic the PCI bus 12. The data frames received from the PCI bus interface unit 16 are passed on a byte-by-byte basis to the transmit FIFO 32. The transmit FIFO 32 has two queues, namely a low priority queue (LO) 32a and a high priority queue (HI) 32b for storing low and high priority data from the PCI bus interface unit 16, respectively.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 detects a collision by the CI inputs, and the MAU 26 detects a collision by sensing activity on both twisted pair signals RXD and TXD. Additional functions of the MAC 20 are described below.

The media 50 may be either coaxial, fiber optic, or twisted pair wire, and hence may couple the interface 10 to 10BASE-T, 10BASE-2, 100BASE-TX, 100BASE-T4, or 100BASE-FX networks. The network may operate at 10 megabits per second (10 Mbit/s), 100 megabits per second (100 Mbit/s), or 1000 megabits per second (1000 Mbit/s).

Figure 2A:
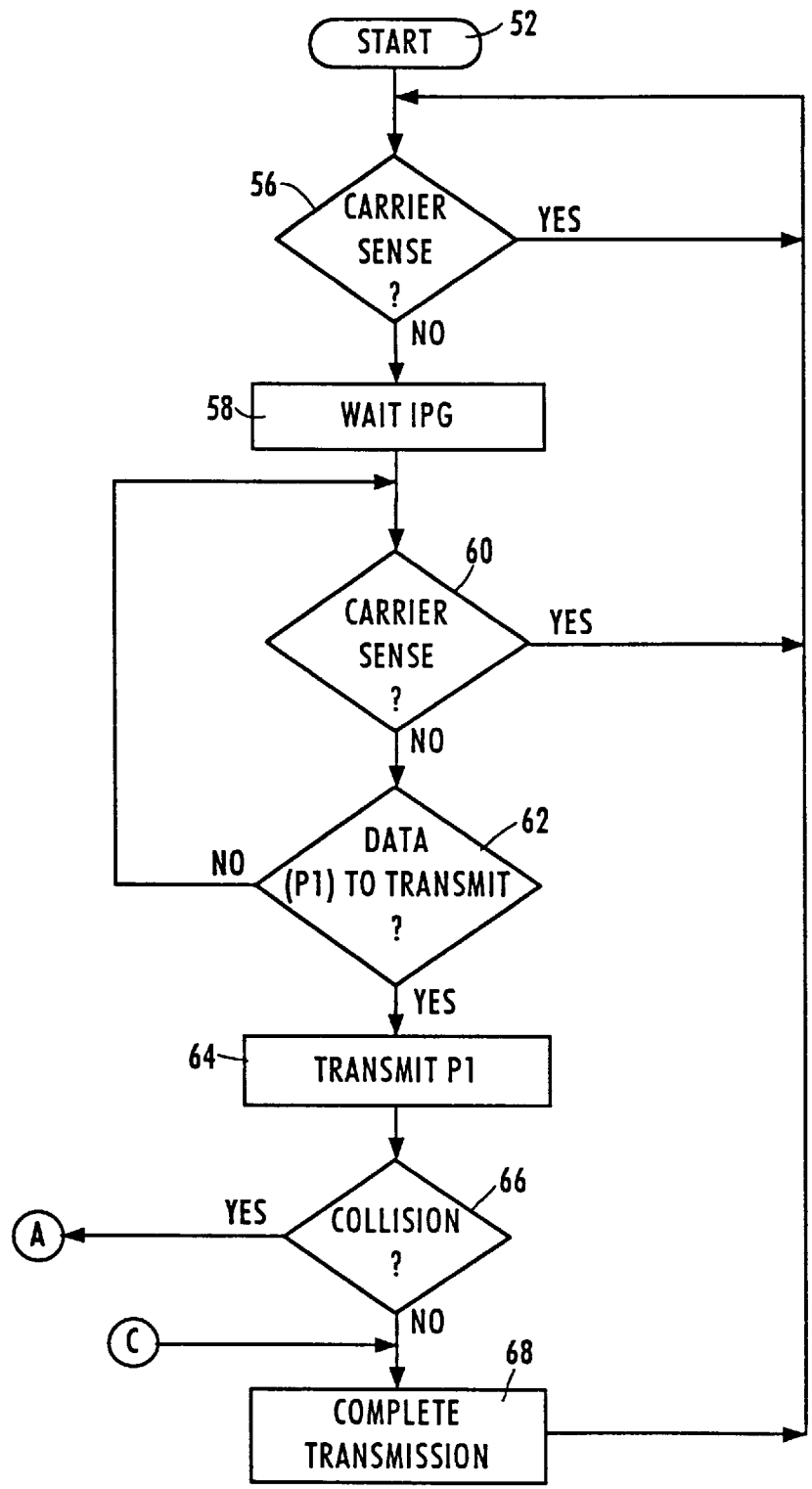
FIGS. 2A and 2B are flow diagrams of the method for accessing media of the network according to the present invention.
Figure 2B:
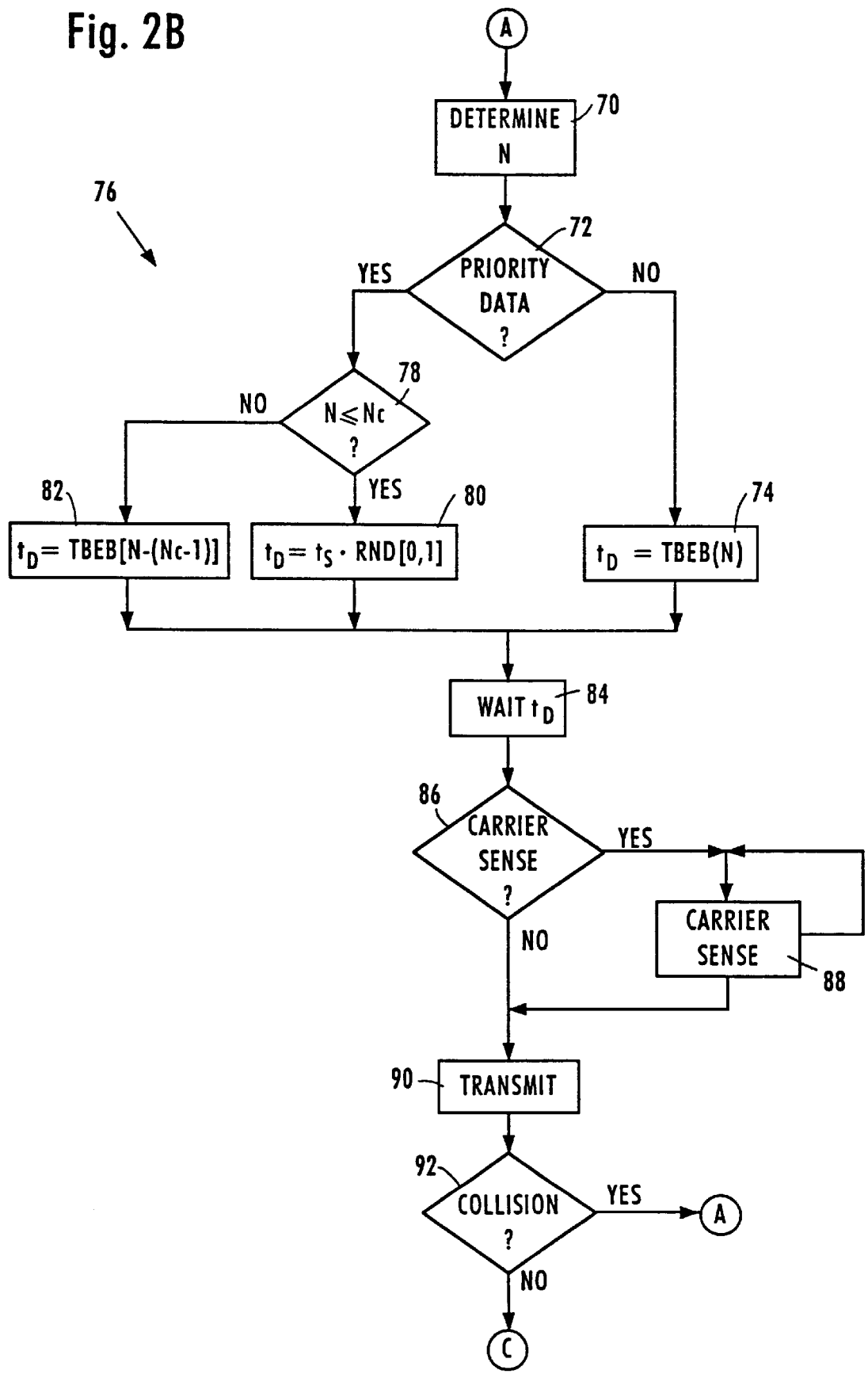

FIGS. 2A and 2B are flow diagrams summarizing the method by a network station having the network interface 10 for accessing the media 50 of an Ethernet network. The method of the present invention can be implemented by embedding executable code within a memory element in the MAC 22 (e.g., register, EPROM, EEPROM, flash memory).

The media access controller (MAC) 22 in the network interface 10 starts in step 52, during which point the Ethernet media 50 is busy with transmission activity by a station. The MAC 22 then checks in step 56 if a receive carrier is sensed on the media 50 using the CSMA/CD, indicating that the network is busy. If the receive carrier is sensed, the MAC 22 waits in step 56 until deassertion of the receive carrier on the media 50 is detected. The MAC 22 starts a delay timer in step 58 in response to the sensed deassertion of the receive carrier, which causes the MAC 22 to wait the minimum IPG interval of 9.6 microseconds ($\mu$s) for a 10 Mbit/s network and 0.96 $\mu$s for a 100 Mbit/s network. A similar IPG interval can be provided for a 1000 Mbit/s network.

While waiting the minimum IPG interval, the MAC 22 checks in step 60 if the carrier is detected on the media 50. If a carrier is detected in step 60, the MAC 22 returns to the wait state in step 56, causing the delay timer to be reset. If no carrier is detected during the delay interval, the MAC 22 checks in step 62 whether the transmit FIFO 32 has a data packet (P1) to send. If the transmit FIFO 32 has data to send, the MAC 22 begins to transmit the data packet in step 64.

After transmission has begun in step 64, the MAC 22 checks in step 66 to determine whether a collision has been detected. If no collision is detected in step 66, the transmission of the data packet is completed in step 68, and the process returns to step 56.

If a collision is detected in step 66, the MAC 22 performs collision mediation, shown in FIG. 2B. The collision mediation of the present invention uses a priority access algorithm for high priority traffic requiring a guaranteed latency, for example multimedia traffic or network management traffic. The MAC 22 mediates collisions by determining a collision backoff interval based on the determined priority of data to be transmitted by the network station. Hence, the MAC 22 determines a collision backoff interval for high priority data that provides the MAC 22 a greater probability of winning the collision mediation. Hence the disclosed collision mediation enables successful transmission of high priority data requiring a guaranteed maximum latency.

One embodiment for determining the collision backoff interval based on the determined priority of data is disclosed in commonly-assigned, copending application No. 08/692,689, filed Aug. 6, 1996, (attorney docket No. 1033-159), the disclosure of which is incorporated in its entirety herein by reference. That copending application prioritized high priority data by randomly selecting an integer multiple of slot times using the TBEB algorithm, and multiplying the integer multiple of slot times by a fractional coefficient (f) corresponding to a priority of the data packet to be transmitted. If the number of access attempts equaled one, the MAC 22 would follow the conventional TBEB algorithm for normal-priority traffic and high-priority traffic. On subsequent collisions, however, MAC 22 would reduce the collision delay interval for the priority traffic by multiplying the randomized number of time slots with the fractional coefficient (f).

According to the disclosed embodiment, the collision mediation for high priority traffic randomly selects an integer multiple of slot times from a predetermined range for a predetermined number of access attempts. If the number of access attempts (N) exceeds the predetermined value, the collision mediation randomly selects the integer multiple of slot times from a range of integers calculated from a shifted exponential number of the access attempts, for example $2^{N-2}$. Hence, the collision mediation grants a station having high priority data a higher probability of successfully accessing the media. The probability of the station successfully accessing the media will also affect the access latency variability. Access latency is defined as the time interval when the frame is at the head of the MAC queue until successful transmission, including the transmit time on the wire. By maintaining a high probability of accessing the media, access latency variability can be controlled.

Collision mediation according to the disclosed embodiment begins in FIG. 2B by determining the number of collisions (N) encountered by the network station. The number of collisions, also referred to as the number of access attempts, may be tracked using an internal collision counter, and incrementing the collision counter during each detected collision.

After the MAC 22 determines the number of collisions (N) encountered by the network station in step 70, the MAC 22 determines the priority of the data to be transmitted by the network station in step 72. If the MAC 22 determines in step 72 that the data to be transmitted is not priority data, the MAC 22 performs conventional collision mediation using the truncated binary exponential backoff (TEEB) algorithm in step 74. As described in detail with respect to FIG. 3, the MAC 22 in step 74 determines a collision backoff interval ($t_D$) based on the number of access attempts, i.e., $t_D$=TBEB (N).

If in step 72 the MAC 22 determines the data to be high priority data, for example by receiving the data from the high priority queue 32b of FIG. 1, the MAC 22 determines the collision delay interval for high priority data, referred to generally in FIG. 2B as step 76.

The collision mediation for high priority data determines in step 78 if the number of collisions encountered is less than or equal to a predetermined value ($N_c$) The predetermined value ($N_c$) may be a programmable value stored in the MAC 22. For example, if the predetermined value is set to three (i.e., $N_c$=3), the collision mediation checks in step 78 if the number of collisions is less than or equal to three. If the number of collisions encountered (N) is less than or equal to the predetermined value ($N_c$), the MAC 22 in step 80 sets the collision delay interval to a value between zero and a predetermined slot time interval ($t_s$). Specifically, the MAC 22 in step 80 uses a randomizing function (RND) to randomly select an integer from the predetermined range of integers [0,1]. Hence, the MAC 22 randomly selects the collision backoff interval either to zero or a single time slot for the first, second, and third retransmission attempts.

If in step 78 the number of collisions encountered is greater than the predetermined value ($N_c$), the MAC 22 in step 82 sets the collision delay interval to an integer multiple of the predetermined slot time interval ($t_s$) using a shifted version of the TBEB algorithm. Specifically, the MAC 22 randomly selects the integer from a shifted exponential number of the access attempts, i.e., according to the function TBEB [N-($N_c$-1)]. Hence, if the number of collisions equals four and the predetermined value equals three (i.e., $N_c$=3), step 82 would perform the function TBEB(2), such that high priority traffic would have an integer multiple of slot times randomly selected from the range [0,3], whereas low priority data would randomly select an integer in step 74 from the range [0,15]. Hence, the TBEB algorithm used in step 82 is a shifted version of the TBEB algorithm used in step 74 for normal priority data. The shifted exponential number of access attempts equals $2^{N-y}$, here y corresponds to the predetermined value $N_c$ (i.e., y=$N_c$-1).

After the collision delay interval is calculated, the MAC 22 uses an internal collision delay counter to wait in step 84 for the calculated delay time $t_D$. While waiting the delay time $t_D$, the MAC 22 checks in step 86 whether a carrier is sensed on the media. If a receive carrier is asserted on the media, the MAC 22 resets the delay timer in step 88 and waits until deassertion of the receive carrier is sensed. Although not shown, waiting in step 88 includes waiting for at least the IPG interval after sensing deassertion of the receive carrier (see steps 56 and 58). If the carrier is not sensed in step 86, then the MAC 22 in step 90 attempts access of the media in response to the detected collision and after the calculated collision delay interval $t_D$. If a collision occurs in step 92, the process returns to step 70. If no collision is detected, then the process returns to step 68 to complete transmission.

Figure 3:
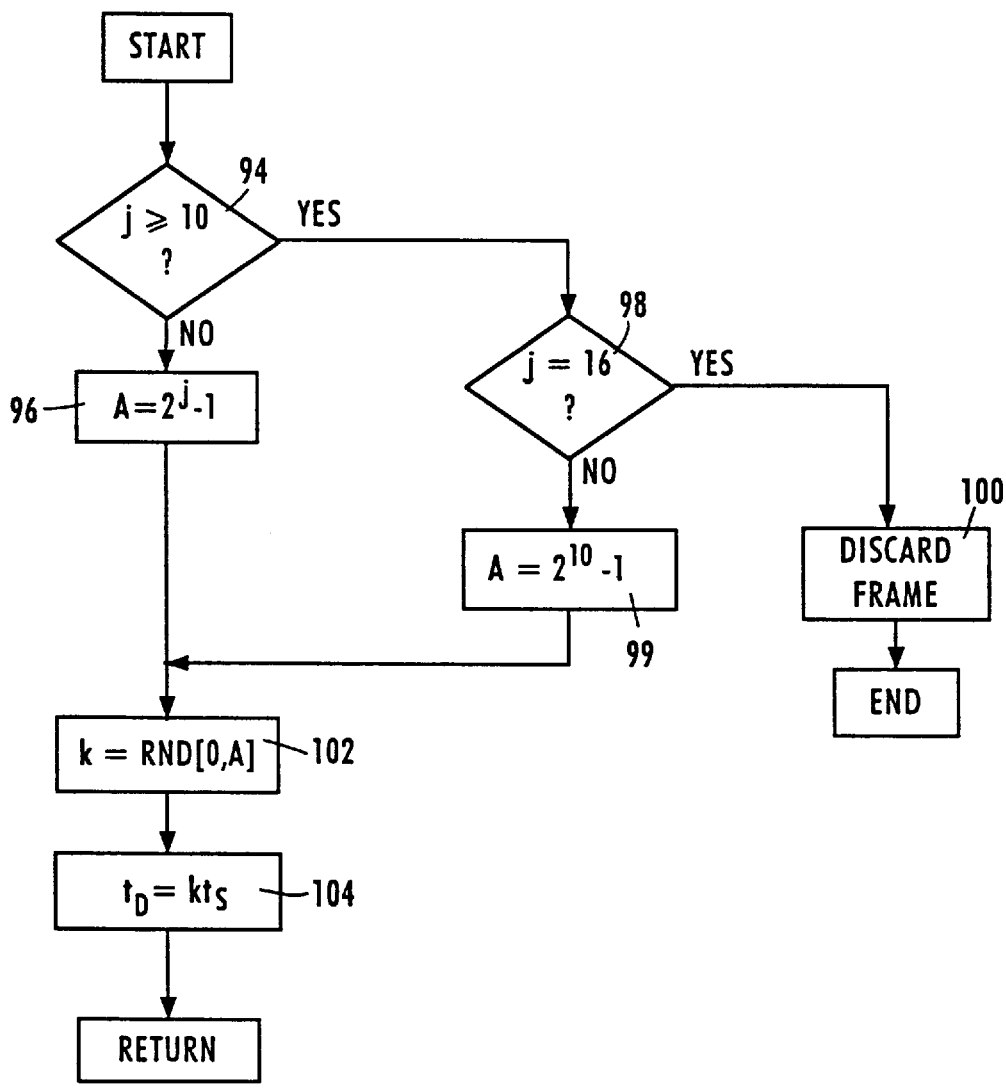
FIG. 3 is a flow diagram of the truncated binary exponential (TBEB) algorithm.

FIG. 3 is a flow diagram illustrating operation of the truncated binary exponential backoff (TBEB) algorithm, where the exponential range of randomly selected integers is based on an integer value j. The operation of FIG. 3 can be characterized by the function f(j)=TBEB(j). Hence, the MAC 22 implements the TBEB algorithm in step 74 of FIG. 2B by setting the operand j equal to the number of access attempts (N) (i.e., j=N), whereas the MAC 22 implements the TBEB algorithm in step 82 by setting j equal to N-2.

The TBEB algorithm according to the operation TBEB(j) begins in step 94, where the MAC 22 checks if the value j is greater than or equal to ten. If the operand j is less than ten in step 94, then an exponential number of access attempts (A) is determined in step 96 according to the equation A=$2^{j-1}$. If in step 94 the operand j is greater than or equal to 10, the MAC 22 then checks in step 98 if j equals 16. If j equals 16, then the frame or data packet to be transmitted is discarded in step 100 in accordance with Ethernet (ANSI/IEEE 802.3) protocol. If j is less than 16 in step 98, then the exponential number of access attempts is set in step 99 to A=$2^{10}$-1, or 1,023.

After calculating the exponential number of access attempts A, the MAC 22 randomly selects an integer value (k) in step 102 from the range between zero and the exponential number of access attempts A having a maximum value of 1,023. The MAC 22 then calculates the delay time ($t_D$) in step 104 by multiplying the predetermined slot time ($t_s$) with the randomly selected integer k.

A slot time ($t_s$) has a duration equal to 512 bit times for 10 and 100 Mbits/s networks. Hence, a slot time will have a duration of 51.2 microseconds in a 10 megabit per second network and 5.12 microseconds in a 100 megabit per second network. The slot time ($t_s$) for a 1000 Mbit/s network is selected in accordance with the network topology and propagation delay, and preferably has a duration equal to 4096 bit times.

Figure 4:
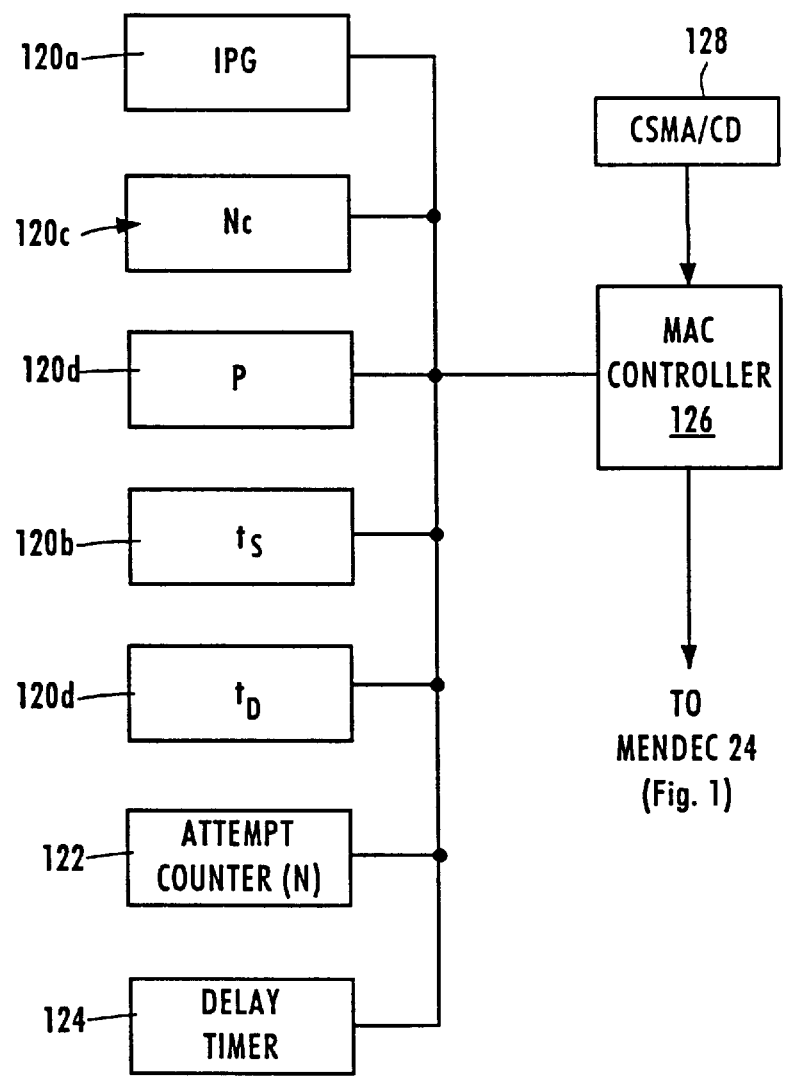
FIG. 4 is a block diagram of the media access control (MAC) of FIG. 1.

FIG. 4 is a block diagram illustrating the functional components of the MAC 22. The media access control 22 includes a plurality of registers 120, a collision counter 122 storing the number of access attempts (N), a delay timer 124 that counts the delay, a controller 126 and a carrier sense multiple access/collision detection (CSMA/CD) portion 128. The values of IPG and $t_s$ stored in registers 120a and 120b respectively are pre-loaded in a nonvolatile memory element. Register 120c is programmed with the predetermined number of collisions ($N_c$) using the predetermined range of integers in step 80 of FIG. 2. The register 120d stores a priority value (P) indicating whether the data to be transmitted is priority data. The MAC controller 126, also referred to as a delay time calculator, calculates the delay time $t_d$, described above, and stores the resulting delay time in register 120d.

The MAC controller 126 starts the delay timer 124 in response to a signal from the CSMA/CD 128 indicating that deassertion of the receive carrier on the media has been sensed. The MAC controller 126 sends an instruction to the Manchester encoder/decoder 24 (MENDEC) to attempt access to the media after the delay timer has reached the determined delay time $t_d$ stored in register 120d.

According to the present invention, selectively modifying the range of integers used for random integer selection provides a network station having high priority traffic a greater probability of accessing the media during collision mediation. Hence, a half-duplex Ethernet network can transport high priority traffic requiring a guaranteed latency.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method in a network station of mediating collisions on network media, comprising:

sensing a collision on the media;

determining a collision backoff interval from a fixed range of integers independent from a number of access attempts by the network station, based on the number of access attempts being less than a prescribed value, greater than one, and a determined priority of data to be transmitted by the network station; and attempting access of the media in response to the detected collision and after the determined collision backoff interval.

2. The method of claim 1, wherein the determining step comprises:

randomly selecting a first integer from the fixed range; and multiply a predetermined slot time with the first integer to obtain the collision backoff interval.

3. The method of claim 2, wherein the selecting step comprises:

(1) if the determined priority is a high priority, randomly selecting the first integer from the fixed range of integers; and (2) if the determined priority is a normal priority less than the high priority, randomly selecting the first integer from a second range of integers calculated from an exponential number of the access attempts.

4. A method in a network station of mediating collisions on network media, comprising:

sensing a collision on the media;

determining a collision backoff interval based on a number of access attempts by the network station and a determined priority of data to be transmitted by the network station; and attempting access of the media in response to the detected collision and after the determined collision backoff interval, wherein the determining step comprises:

selecting a first integer based on the number of access attempts and the determined priority, and multiplying a predetermined slot time with the first integer to obtain the collision backoff interval;

wherein the selecting step comprises:

(1) if the determined priority is a high priority, randomly selecting the first integer from a first predetermined range of integers, (2) if the determined priority is a normal priority less than the high priority, randomly selecting the first integer from a second range of integers calculated from an exponential number of the access attempts, and (3) if the determined priority is a high priority and the number of access attempts exceeds a predetermined value, randomly selecting the first integer from a third range of integers calculated from a shifted exponential number of the access attempts.

5. The method of claim 2, further comprising receiving the data from one of first and second queues storing high priority data and low priority data, respectively.

6. A method in a network station of mediating collisions on network media, comprising:

sensing a collision on the media;

determining a collision backoff interval based on a number of access attempts by the network station and a determined priority of data to be transmitted by the network station; and attempting access of the media in response to the detected collision and after the determined collision backoff interval, wherein said determining step comprises:

(1) multiplying a predetermined slot time interval with a first integer, randomly selected from between zero and one, based on the determined priority having a high priority and the number of access attempts being less than or equal to a predetermined value, and (2) multiplying the predetermined slot time interval with a second integer, randomly selected from a range of integers calculated from a shifted exponential number of the access attempts, based on the determined priority having the high priority and the number of access attempts exceeding the predetermined value.

7. The method of claim 6, wherein the predetermined slot time interval equals 512 bit times.

8. The method of claim 6, wherein the predetermined slot time interval equals 4096 bit times.

9. The method of claim 1, wherein the determining step comprises selecting as the collision backoff interval one of a predetermined slot time interval and zero, based on the priority being a high priority and the number of access attempts being less than the predetermined value.

10. A method in a network station of mediating collisions on network media, comprising:
   sensing a collision on the media;
   determining a collision delay interval, comprising:
      (1) determining a priority of data to be transmitted by the network station,
      (2) determining a number of collisions encountered by the network station,
      (3) if the number of collisions encountered is less than or equal to a predetermined value, setting the collision delay interval to a value from zero to a predetermined slot time interval for high priority data, and
      (4) if the number of collisions encountered exceeds the predetermined value, setting the collision delay interval to an integer multiple of the predetermined slot time interval, the integer selected from a range of integers calculated from a shifted exponential number of the access attempts; and
   attempting access of the media following the collision delay interval after the detected collision.

11. The method of claim 10, wherein the range of integers has a maximum value of $2^{10}-1$.

12. The method of claim 10, wherein the shifted exponential number of access attempts equals $2^{n-y}$, where n equals the number of access attempts and y is a number corresponding to said predetermined value.

13. The method of claim 10, wherein the predetermined slot time interval equals 512 bit times.

14. The method of claim 10, wherein the network has a data rate of 1000 megabits per second and the predetermined slot time interval equals four thousand ninety six (4096) bit times.

15. A network interface for connection with network media, comprising:
   a storage for establishing a queue of data identified as having high priority for transmission on the media;
   a collision sensor for sensing a collision on the media;
   a delay time calculator configured to selectively calculate a delay time from a fixed range of integers based on a number of access attempts by the network interface less than a predetermined number, greater than one, and the priority of the corresponding data; and
   a media access device for attempting access of the media in response to the sensed collision of the media and after said delay time.

16. The network interface of claim 15, wherein the delay time calculator sets the delay time to one of zero and one slot time interval for the high priority data if the number of access attempts is less than or equal to said predetermined number.

17. The network interface of claim 16, wherein the delay time calculator is arranged to calculate said delay time as an integer multiple of the slot time interval if the number of access attempts exceeds said predetermined number, the delay time calculator randomly selecting the integer from a range of integers calculated from a shifted exponential number of said access attempts.

18. A method in a network station of accessing a network media, comprising:
   transmitting a data packet carrying high priority data;
   sensing a collision on the media;
   determining a collision delay interval by randomly selecting an integer multiple of slot times from a predetermined fixed range, based on a number of access attempts having a value less than or equal to a predetermined number, greater than one; and
   attempting access of the media in response to the detected collision and after the collision delay interval.

19. The method of claim 18, wherein said data is multimedia data requiring a guaranteed maximum latency.

20. The method of claim 18, wherein said high priority data is management data.

21. A method of limiting access latency during data transmission in a network station, comprising:
   sensing a collision on a network media;
   if a number of access attempts (N) is less than or equal to a predetermined number, randomly selecting a delay time between and including zero and a predetermined slot time;
   if the number of access attempts (N) is greater than said predetermined number, determining said delay time by (1) randomly selecting an integer from a range having a maximum value of $2^{n-2}$, and (2) multiplying the selected integer with the predetermined slot time; and
   attempting access of the media in response to the detected collision and after the determined delay time.

22. The method of claim 21, further comprising programming said predetermined number in the network station.

23. The method of claim 21, further comprising receiving the data for transmission from a queue reserved for high priority traffic.

24. The method of claim 23, wherein the network media transports data packets according to Ethernet half-duplex protocol.

25. The network interface of claim 15, wherein the delay time calculator selectively calculates a delay time from a fixed range of integers based on the corresponding data having a high priority and the number of access attempts by the network interface having a value less than or equal to a prescribed number.

26. The network interface of claim 15, wherein the network interface is configured for outputting multimedia data requiring a guaranteed maximum latency from the storage.

27. The network interface of claim 15, wherein the network interface outputs management data from said storage as high priority data.

* * * * *